(12) United States Patent
Maier et al.

(10) Patent No.: US 11,899,130 B2
(45) Date of Patent: Feb. 13, 2024

(54) METHOD AND DEVICE FOR DETERMINING A RADAR CROSS SECTION, METHOD FOR TRAINING AN INTERACTION MODEL, AND RADAR TARGET EMULATOR AND TEST FACILITY

(71) Applicant: AVL LIST GMBH, Graz (AT)

(72) Inventors: Franz Michael Maier, Graz (AT); Vamsi Prakash Makkapati, Hausmannstätten (AT)

(73) Assignee: AVL List GmbH, Graz (AT)

( * ) Notice: Subject to any disclaimer, the term of this patent is extended or adjusted under 35 U.S.C. 154(b) by 688 days.

(21) Appl. No.: 17/046,955

(22) PCT Filed: Apr. 12, 2019

(86) PCT No.: PCT/AT2019/060125
§ 371 (c)(1),
(2) Date: Apr. 9, 2021

(87) PCT Pub. No.: WO2019/195872
PCT Pub. Date: Oct. 17, 2019

(65) Prior Publication Data
US 2021/0239796 A1   Aug. 5, 2021

(30) Foreign Application Priority Data

Apr. 13, 2018  (AT) ............... A 50318/2018

(51) Int. Cl.
*G01S 13/931* (2020.01)
*G01S 7/40* (2006.01)
*G01S 7/41* (2006.01)

(52) U.S. Cl.
CPC .............. *G01S 7/4078* (2021.05); *G01S 7/40* (2013.01); *G01S 7/412* (2013.01); *G01S 13/931* (2013.01)

(58) Field of Classification Search
CPC ........ G01S 13/42; G01S 13/931; G01S 7/021; G01S 7/40; G01S 7/4052; G01S 7/4069; G01S 7/4078; G01S 7/41; G01S 7/412
See application file for complete search history.

(56) References Cited

U.S. PATENT DOCUMENTS 9,575,161 B1   2/2017  Haghighi et al.
2002/0198670 A1  12/2002  Christiansen et al.
(Continued)

FOREIGN PATENT DOCUMENTS

DE  102014118625   6/2016
EP      0157153    10/1985
(Continued)

OTHER PUBLICATIONS

Official Action with English Translation for Japan Patent Application No. 2020-555809, dated Feb. 13, 2023, 6 pages.
(Continued)

*Primary Examiner* — Timothy A Brainard
(74) *Attorney, Agent, or Firm* — Sheridan Ross P.C.

(57) ABSTRACT

A method and a device for determining a radar cross section, a method for training an interaction model, a radar target emulator for manipulating a radar signal, and a test facility for a vehicle are described herein. The propagation of a virtual radar signal is simulated on the basis of an interaction model in a simulated environment scenario that contains the simulated radar target. An interaction of the virtual radar signal with the simulated radar target is modelled such that a physical variable, characterizing the virtual radar signal, is divided into a directional component that corresponds to a directed scattering of the virtual radar signal and into a diffuse component that corresponds to an isotropic scattering of the virtual radar signal. A value of the physical variable is determined at a receiver point in the simulated environment scenario, taking into account the directional compo- (Continued)

nent and the diffuse component, and the radar cross section of the simulated radar target is derived from the determined value of the physical variable at the receiver point.

13 Claims, 2 Drawing Sheets

(56) References Cited

U.S. PATENT DOCUMENTS

| | | |
|---|---|---|
| 2003/0234786 A1 | 12/2003 | Cole et al. |
| 2012/0274506 A1 | 11/2012 | Doria |
| 2017/0132335 A1 | 5/2017 | Pechberti et al. |
| 2019/0041496 A1* | 2/2019 | Salvesen ............... G01S 7/4052 |

FOREIGN PATENT DOCUMENTS

| | | |
|---|---|---|
| EP | 3260875 | 12/2017 |
| JP | 2001-524676 | 12/2001 |
| JP | 2005-181153 | 7/2005 |
| JP | 2008-241321 | 10/2008 |
| JP | 2010-032420 | 2/2010 |
| JP | 2012-230102 | 11/2012 |
| JP | 2018-507385 | 3/2018 |

OTHER PUBLICATIONS

Gruber et al. "Highly Scalable Radar Target Simulator for Autonomous Driving Test Beds," 2017 European Radar Conference (EURAD), Oct. 12, 2017, pp. 147-150.

Paris et al. "Real-Time Channel Emulator for Radar-Altimeters Characterization," 2016 European Radar Conference (EURAD), EuMA, Oct. 5, 2016, pp. 221-224.

Official Action for Austria Patent Application No. A 50318/2018, dated Feb. 14, 2019, 3 pages.

International Search Report and Written Opinion for International (PCT) Patent Application No. PCT/AT2019/060125, dated Jul. 17, 2019, 11 pages.

English Translation of the International Search Report for International (PCT) Patent Application No. PCT/AT2019/060125, dated Jul. 17, 2019, 2 pages.

\* cited by examiner

METHOD AND DEVICE FOR DETERMINING A RADAR CROSS SECTION, METHOD FOR TRAINING AN INTERACTION MODEL, AND RADAR TARGET EMULATOR AND TEST FACILITY

CROSS REFERENCE TO RELATED APPLICATIONS

This application is a national stage application under 35 U.S.C. 371 and claims the benefit of PCT Application No. PCT/AT2019/060125 having an international filing date of 12 Apr. 2019, which designated the United States, which PCT application claimed the benefit of Austria Patent Application No. A50318/2018 filed 13 Apr. 2018, the disclosures of each of which are incorporated herein by reference in their entireties.

The present invention relates to a method and a device for determining a radar cross section of a simulated radar target, in particular for stimulating a real radar signal in a radar target emulator, a method for training an interaction model, a radar target emulator for manipulating a real radar signal output by a vehicle, in particular a motor vehicle, as well as a test facility for a vehicle, in particular a motor vehicle, having such a radar target emulator.

Radar sensors play a central role among the various environmental sensors in current vehicles due to their robustness against various weather conditions. Various driver assistance systems therefore frequently access the sensor data provided by the radar sensors.

In order to test driver assistance systems, so-called Vehicle-in-the-Loop test facilities are known in which the environmental sensors, particularly radar sensors, are stimulated according to a test scenario generated by an environment simulation. The control signals of the driver assistance system thereupon generated are fed back to the environment simulation in real time so as to enable dynamic testing.

The stimulation of radar sensors generally involves manipulation, in particular modulation, of their emitted radar signals, whereby the manipulation is characterized by the test scenario. The radar signals modulated as such, which represent the test scenario, are then sent back to the radar sensors.

Manipulating a radar signal according to the test scenario requires so-called stimulation points which contain information regarding the manipulation to be realized. Stimulation points can in particular include distances between the objects contained in the test scenario and the test vehicle with the driver assistance system to be tested, the azimuth angles of these objects relative to the test vehicle, the Doppler shift which occurs due to the relative movement of the test vehicle objects, as well as the radar cross section of the objects.

Various approaches are known for calculating the radar cross section from the simulation data provided by the environment simulation. In particular, statistical models which depend on object properties such as position (relative to the test vehicle) and dimension can be generated and noise can be added. Alternatively, the objects can be represented by virtual scattering centers. Ray tracing approaches which also factor in material properties of the objects are likewise known. However, these approaches are not real time-capable and thus not suitable for dynamic testing in a Vehicle-in-the-Loop test facility.

US 2002/0198670 A1, for example, describes an electromagnetic simulation algorithm which enables calculating the electromagnetic wave scattered on a conductor in a mono-frequency situation. Particularly able to thereby be calculated are radar scattering cross sections of objects for which the geometrical dimensions are known. To that end, the electromagnetic boundary integral equation is solved by means of preconditioning an interaction matrix M and an iterative algorithm mapping a conjugate gradient technique. This results in surface currents on the object generated by the radiation of waves, on the basis of which the scattered waves can be determined.

US 2003/0234786 A1 relates to the generating of automatically factored approximations for bidirectional reflectance distribution functions. A search space is thereby searched for texture factors for an initial set of projections in an inner loop which, when combined with the projections, best approximates a bidirectional reflectance distribution function. The approximation errors that occur are minimized in an outer loop by searching for the set of projections for which the error is minimal. Reflectance values for different viewing angles are calculated from the full approximation of the bidirectional reflectance distribution function.

EP 0 157 153 A1 discloses a method for computer-aided simulation of complete radar systems, wherein a momentary power spectrum of a transmitter is used as a signal and the signal is modified according to the propagation path and target properties. The method provides the statistical moments of the processed signal. Amplitude and phase progression of the transmitter signal are specified in a transmitter simulator and a power spectrum produced. A generalized radar equation converts geometric factors, target properties, propagation losses and antenna gains into the receiver signal in a target simulator. The simulation method can be analytically expressed as a formation of the accumulated energy.

It is a task of the invention to improve the emulation of radar targets. A task in particular is the emulating of radar targets in real time.

This task is solved by a method and a device for determining a radar cross section of a simulated radar target, a method for training an interaction model, a radar target emulator for stimulating a real radar signal output by a vehicle, as well as a test facility for a vehicle having such a radar target emulator pursuant to the independent claims. Preferential embodiments of the invention constitute the subject matter of the subclaims.

A first aspect of the invention relates to a method for determining a radar cross section of a simulated radar target which can in particular be used to stimulate a real radar signal in a radar target emulator, the method preferably comprising the following procedural steps:
  (i) Simulating the propagation of a virtual radar signal on the basis of an interaction model in a simulated environment scenario which contains the simulated radar target, wherein an interaction of the virtual radar signal with the simulated radar target is modeled such that a physical variable characterizing the virtual radar signal is divided into a directional component corresponding to a directed scattering of the virtual radar signal and a diffuse component corresponding to an isotropic scattering of the virtual radar signal;
  (ii) Determining a value of the physical variable at a receiver point in the simulated environment scenario factoring in the directional component and the diffuse component; and
  (iii) Deriving the radar cross section of the simulated radar target from the determined value of the physical variable at the receiver point.

A radar signal within the meaning of the invention is in particular an electromagnetic wave and is preferably characterized by an amplitude, a phase, a frequency and/or a direction of propagation. The radar signal thereby propagates along the direction of propagation preferably within a solid angle range, the so-called field of view (FoV).

A simulated environment scenario within the meaning of the invention is in particular a situation in which at least one simulated radar target, for example a vehicle, pedestrian, building or other object in the environment, is in defined relationship, in particular a distance, orientation and/or motion, to a vehicle to be tested. The environment scenario can in particular be a traffic situation.

As defined by the invention, a physical variable which characterizes a virtual radar signal is in particular a variable which describes the radar signal. The physical variable can for example contain information about the amplitude and/or phase of the radar signal. Preferably, the physical variable is a power density or field strength of the radar signal. A physical variable value, such as is determined for instance at the receiver point, can thus for example be a scattering angle dependent power.

A directed scattering within the meaning of the invention is in particular the scattering of the power or respectively field strength in a solid angle range. The radar signal scattered as such, or respectively the radar signal component scattered as such, propagates from the simulated radar target preferably within a so-called reflection cone, e.g. within a defined solid angle range.

A second aspect of the invention relates to a method for determining a radar cross section of a simulated radar target which can in particular be used to stimulate a real radar signal in a radar target emulator using the Phong formula, preferably pursuant to the method according to the first aspect of the invention.

The first and second aspects of the invention are based in particular on the approach of preferably modeling the interaction of radar signals preferably simulated as radar beams with objects from an environment scenario such that after the interaction, one part of the radar signal propagates according to specular scattering on the objects, for example per reflection, and another part of the radar signal propagates according to diffuse, in particular isotropic, scattering on the objects. The radar cross section of the objects can then be determined by analyzing all the parts of the radar signals at a receiver point within the simulated environment scenario, which preferably also corresponds to the point of origin of the radar signals.

The interacting of the radar beams propagating in the environment scenario with the simulated radar targets is preferably based on an interaction model. The interaction model is thereby preferably represented by the Phong formula to which a normalizable directionality term can be added. In so doing, the power density, or as applicable the field strength, can be divided into a directional component and a diffuse component for each individual radar beam in the simulated environment scenario. Multiple scattering of the radar signal on multiple simulated radar targets can be simulated on the basis of the directed component with little computing effort. It is therefore possible for the radar cross section of a simulated radar target to be derived at least substantially in real time based on the total power density at the receiver point. The total power density thereby comprises a background component, namely the diffuse components of the radar signal, and a directed component, namely the directed components of the radar signal reflected (back) to the receiver point or toward the receiver point respectively.

The inventive method for determining a radar cross section of a simulated radar target is flexible in use, for instance in so-called virtual validation. It can be used for example to stimulate, in particular mathematical, radar sensor models.

Overall, the invention enables the real-time determining of a radar cross section of a simulated radar target which takes interreflections into account.

In one preferential embodiment, the propagation of the virtual radar signal from a transmitter point in the environment scenario to the simulated radar target is simulated on the basis of an analytic description of the propagation of radar signals. In particular, the propagation of the virtual radar signal can be determined using a numerical calculation based on the analytic description. The propagation can for example be simulated by means of ray tracing. This enables a particularly precise and realistic determination of the virtual radar signal propagation up to impact with a simulated radar target. Since this radar signal propagation is preferably modeled at least substantially rectilinearly, it can also be simulated in real time.

Preferably, also the propagation of at least one part of the radar signal particularly characterized by the directional component subsequent to the interaction with the simulated radar target is simulated on the basis of an analytic description of the radar signal propagation, in particular by ray tracing. In particular, the propagation of the virtual radar signal subsequent interaction with the simulated radar target can be simulated from the simulated radar target to the receiver point on the basis of the analytic description of the radar signal propagation. The part of the radar signal characterized by the directional component of the physical variable can for example contain a plurality of partial signals propagating substantially rectilinearly. The directions of propagation of the partial signals thereby preferably lie within a reflection cone.

As defined by the invention, a partial signal is in particular a single radar beam.

If at least a part of the partial signal then impinges a simulated radar target again, the interaction of the partial signal component with the simulated radar target is again described on the basis of the interaction model. Thus, interreflections of the radar signal propagating from the transmitter point can also be simulated precisely and realistically, thereby enabling a particularly realistic radar cross section to be derived.

Preferentially, the virtual radar signal in the simulated environment scenario is thus described on the basis of two processes: On the one hand, the at least substantially rectilinear propagation of at least part of the radar signal between the transmitter point and at least one simulated radar target or between multiple simulated radar targets can be simulated on the basis of an analytic description of the radar signal propagation, particularly ray tracing. On the other hand, the interaction of the radar signal or at least a part of the radar signal with the simulated radar targets can be simulated on the basis of the interaction model. All in all, this allows a particularly rapid and precise determination of one or more radar cross sections.

In a further preferential embodiment, the virtual radar signal contains a plurality of partial signals and the interaction of the virtual radar signal with the simulated radar target is modeled for each of the partial signals. Preferably, the radar cross section is thereby derived on the basis of a plurality of determined physical variable values at the receiver point. A particularly realistic radar signal propagation in the simulated environment scenario can thereby be simulated.

Preferably, the physical variable values for all the diffuse components of the partial signals as well as the physical variable values of those directional components characterizing the partial signals scattered in the direction of the receiving point are totaled at the receiving point. The radar cross section can then be determined on the basis of this sum.

The propagation of the partial signals is preferentially assumed to be substantially rectilinear. Preferably, the partial signals thereby have different directions of propagation. As a result, a solid angle range in which the radar signal propagates can be attributed to the radar signal. When calculating radar cross sections, the interaction of the radar signal with simulated radar targets outside of the associated solid angle range can then be accordingly disregarded, which accelerates the determination of the radar cross section.

In a further preferential embodiment, the physical variable is divided into the directional component and the diffuse component as a function of at least one model parameter characterizing a physical property of the simulated radar target. This thereby enables physical properties of the simulated radar target to be factored into the calculation of the radar cross section. For example, a surface property of the radar target, a material of the radar target and/or the like can be taken into account.

Preferably, the at least one model parameter is a parameter of the Phong formula. In particular, the at least one model parameter can be a prefactor which indicates the diffusely scattered portion of the radar signal. Alternatively or additionally, the at least one model parameter can be a prefactor indicating the directionally scattered portion of the radar signal. Alternatively or additionally, the at least one model parameter can also be an exponent which indicates the width of a reflection cone within which directionally scattered components of the radar signal propagate. At least two of the model parameters can thereby be dependent on each other.

A third aspect of the invention relates to a method for training an interaction model by means of which an interaction of a virtual radar signal with a simulated radar target can be modeled such that a physical variable characterizing the virtual radar signal is divided into a directional component corresponding to a directed scattering of the virtual radar signal and a diffuse component corresponding to an isotropic scattering of the virtual radar signal.

The method comprises the following procedural steps: (i) Simulating the interaction of a virtual radar signal with a reference target on the basis of an analytic description of the reflection of the radar signal at the reference target, wherein at least one value of a physical variable which characterizes the virtual radar signal reflected at the reference target is determined, or modeling the interaction of a real radar signal with a real emulation of the reference target, wherein at least one value of the physical variable which characterizes the real radar signal reflected on the real emulation of the reference target is measured; and (ii) determining at least one model parameter of the interaction model on the basis of the at least one determined value of the physical variable.

Within the meaning of the invention, training an interaction model is in particular an adapting of the, preferably phenomenological, interaction model, in particular the Phong formula, to an analytic description of the interaction of a virtual radar signal with a simulated radar target or to the results of an experiment on real radar signal reflection. The analytic description of the interaction can for example be given by the so-called RCS theory which enables conclusions as to the propagation of radar signals and in particular the interaction of radar signals with objects. The analytic description can in particular be based on an analytical model for the propagation of radar signals, particularly the reflection of radar signals on objects. The experiment which enables a modeling of the interaction of a real radar signal with a real object, for instance a reference target, can for example be realized with an experimental setup which replicates the reflection of a virtual radar signal on the simulated radar target, in particular a reference target. Preferably, the at least one model parameter of the interaction model is determined by comparing the at least one determined value of the physical variable with an analytically or experimentally determined value of the physical variable, in particular with a physical variable value numerically determined on the basis of the analytic description.

As defined by the invention, at least one value of a physical variable in particular indicates a scattering angle dependent power of the radar signal scattered at the simulated radar target. The at least one physical variable value can in particular form a scattering characteristic.

The determination of at least one model parameter is in particular a normalizing of a prefactor of the interaction model. For example, the determination of at least one model parameter can be a normalizing of a prefactor of the Phong formula which specifies the directionally scattered portion of the radar signal.

The third aspect of the invention is based in particular on the approach of simulating or modeling on the basis of an experiment the interaction of a virtual or real radar signal with a reference target with known properties, in particular dimension, position, surface property and/or material, based on an analytic description, for example by numerically solving appropriate equations, and thereby determining at least one value of a physical variable, for example the power density and/or the field strength of the radar signal. The interaction model to be trained can then be related to the at least one determined physical variable value, from which preferably at least one model parameter of the interaction model results. In particular, at least one model parameter of the interaction model can in this way be normalized. This thereby ensures that when the interaction model is used at a receiver point in the simulated environment scenario, the same value is obtained for the physical variable as in a more complex calculation based on the analytic description of the interaction.

A scattering characteristic of the reference target indicating the power as a function of the scattering angle, for example, can be determined on the basis of the analytic description. The interaction model, for example the Phong formula, can then be adapted by suitably selecting the at least one model parameter such that a scattering characteristic determined by means of the interaction model corresponds to the beam characteristic determined on the basis of the analytic description.

Alternatively conceivable is determining the propagation of a real radar signal reflected on a real emulation of the reference target by measuring at least one value of the physical variable. The at least one model parameter can then be determined on the basis of the at least one measured value of the physical variable.

Preferably, the at least one determined model parameter is stored. This thereby enables the interaction of the virtual radar signal with a simulated radar target to be specified at any time.

In one preferential embodiment, the at least one model parameter is determined on the basis of a curve fitting, in particular a regression analysis. In particular, the at least one model parameter can form a parameter to fit the determined values of the physical variable. Preferably, the at least one model parameter is adapted under the curve fitting until there is minimal deviation between a physical variable value calculated on the basis of the analytic description and a physical variable value calculated on the basis of the Interaction model. The at least one model parameter can thereby be determined particularly reliably and precisely.

In a further preferential embodiment, the reference target is a sphere. This is particularly advantageous since reliable analytic descriptions of the interaction with radar signals are known for a sphere.

In a further preferential embodiment, the propagation of the virtual or real radar signal is simulated or modeled for multiple different reference objects. Preferably, at least one model parameter is in each case determined on the basis of the physical variable values thereby determined and the determined model parameters are stored as a function of object properties of the multiple different reference objects. By accessing the stored model parameters, a value for the physical variable, and thus the effective cross section, can reliably be precisely determined in the receiver point for different simulated radar targets having e.g. different surface properties, comprising different materials and/or the like.

In particular, the interaction model can thereby be trained for different reference objects of respectively different surface properties and/or respectively different materials. On the basis of the determined model parameters, a so-called lookup table can for example be generated which enables simple configuration of the interaction model for different radar targets when using the interaction model.

A fourth aspect of the invention relates to a device for determining a radar cross section of a simulated radar target configured to realize a method according to the first, second and/or third aspect of the invention. In doing so, a realistic radar cross section can be precisely and quickly determined, particularly at least substantially in real time.

Preferably, the device for determining a radar cross section is configured to record simulation data of a simulation device which characterizes a simulated environment scenario and determine the radar cross section of a simulated radar target contained in the environment scenario on the basis of the simulation data using the interaction model. The simulation data thereby contains for example information regarding the object type of the simulated radar target, the shape of the radar target, the position of the radar target in the environment scenario, the orientation of the radar target in the environment scenario and/or the like. In addition to the radar cross section, the device is preferentially configured to also output further data needed to manipulate a real radar signal. In particular, the device can be configured to output stimulation points on the basis of the simulation data and the interaction model.

A fifth aspect of the invention relates to a radar target emulator for manipulating a real radar signal output by a vehicle, in particular a motor vehicle. The radar target emulator preferably comprises a simulation device which is configured to simulate an environment scenario and output simulation data characterizing the environment scenario. The radar target emulator preferably further comprises a device for determining a radar cross section of a simulated radar target as per the fourth aspect of the invention, same being configured to output at least one stimulation point on the basis of the simulation data. In addition, the radar target emulator preferably comprises a stimulation device configured to record, in particular receive, the real radar signal, manipulate the real radar signal on the basis of the at least one stimulation point, and output, in particular transmit, the thusly manipulated radar signal. The simulation device is thereby preferably configured to simulate the environment scenario on the basis of boundary conditions specified by a driver assistance system.

A sixth aspect of the invention relates to a test facility for a vehicle, in particular a motor vehicle, comprising a radar target emulator according to the fifth aspect of the invention. A Vehicle-in-the-Loop test facility which enables dynamic testing of the vehicle's driver assistance systems can thereby be realized.

The features and advantages described with respect to the first aspect of the invention and advantageous embodiment thereof also apply, at least where technically sensible, to the second, third, fourth, fifth and sixth aspect of the invention and advantageous embodiment thereof and vice versa.

The invention will be explained in greater detail below on the basis of non-limiting exemplary embodiments as depicted in the figures. Shown at least partially schematically therein.

Figures 1, 2:
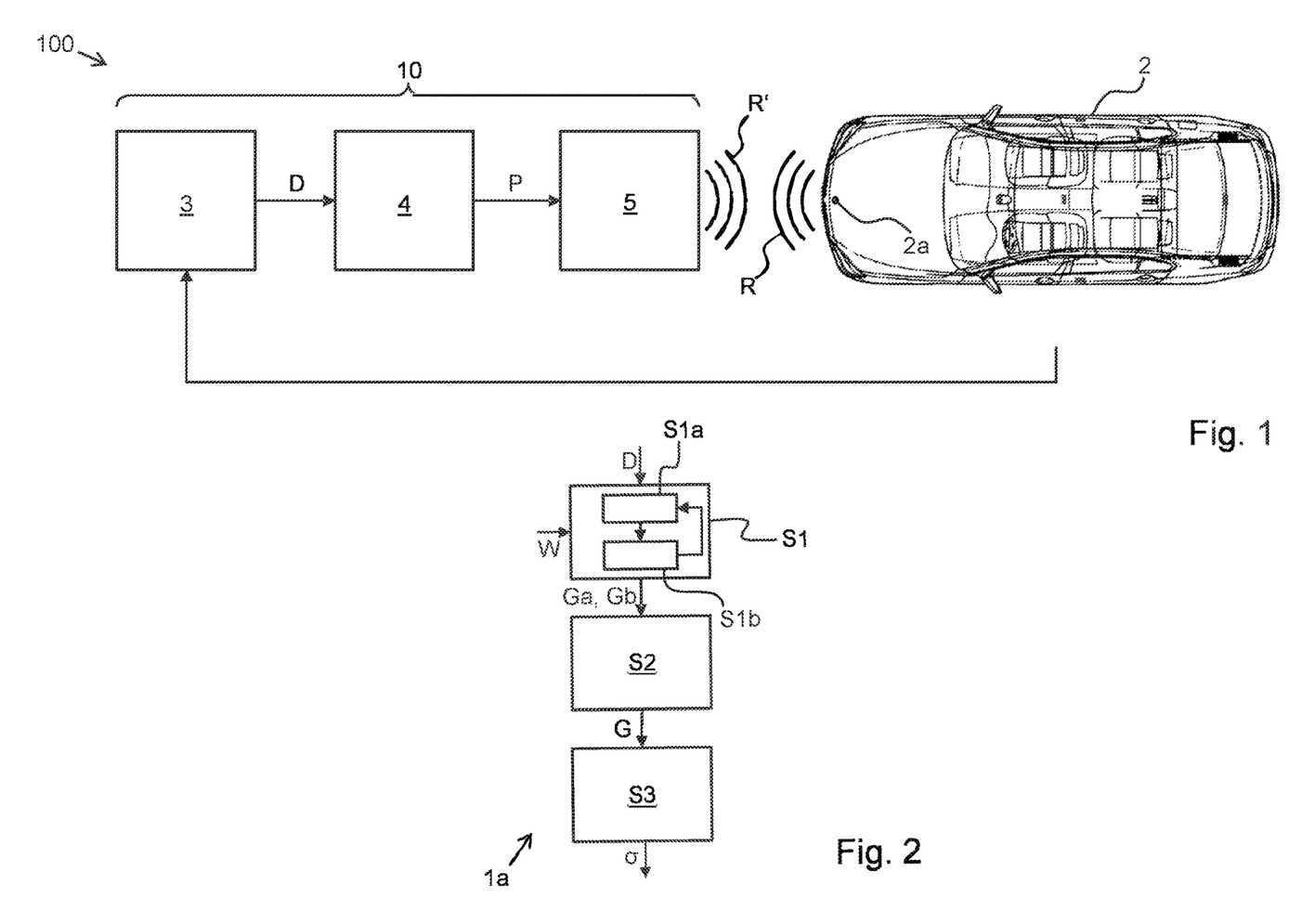
FIG. 1 a preferential exemplary embodiment of an inventive test facility.
FIG. 2 a preferential exemplary embodiment of an inventive method for determining a radar cross section.

FIG. 1 shows a preferential exemplary embodiment of an inventive test facility 100 for a vehicle 2, particularly a motor vehicle, with a radar sensor 2a. The test facility 100 has a radar target emulator 10 for manipulating a real radar signal R output by the radar sensor 2a, whereby the radar target emulator 10 comprises a simulation device 3, a device 4 for determining a radar cross section of a simulated radar target and a stimulation device 5.

The simulation device 3 is preferably configured to simulate an environment scenario and output simulation data D which characterizes the environment scenario. The environment scenario contains for example simulated radar targets. On the basis of the simulation data D, the device 4 can preferentially output at least one stimulation point P which in particular contains the radar cross section of at least one simulated radar target. Based on the at least one stimulation point P, the stimulation device 5 can manipulate the real radar signal R received and return it to the radar sensor 2a as a manipulated radar signal R'.

The vehicle 2, in particular a driver assistance system of the vehicle 2 operated on the basis of the radar sensor 2a sensor data, is preferably connected to the simulation device 3. As a result, an input of the vehicle 2, in particular a vehicle 2 behavior contingent on the driver assistance system, can be factored in as part of the simulation of the environment scenario. In other words, the connection of the vehicle 2 to the simulation device 3 enables a feedback between the reaction of the vehicle 2 and the simulated environment scenario, by means of which the vehicle 2, or the driver assistance system respectively, can be tested dynamically.

The simulation device 3 can for instance be a computer configured to run software for simulating environment scenarios, e.g. CarMaker®. The simulation device 3 preferably simulates a situation in the context of which the vehicle 2 could be operated. For example, the vehicle's journey can be simulated taking into account other road users, environmental conditions such as weather, time of day or road conditions, and/or the like. The situation can in particular be characterized by positions, orientations and/or types of other road users or obstacles. This information is preferentially contained in the simulation data D.

The device 4 for determining a radar cross section of a simulated radar signal is preferably configured to process the simulation data D such that a radar signal R emitted by the radar sensor 2a can be manipulated in accordance with the simulated environment scenario; i.e. a manipulated radar signal R' which characterizes the environment scenario can be generated on the basis of the emitted radar signal R. To that end, the device 4 can simulate the propagation of a virtual radar signal, which preferably corresponds to the radar signal R emitted by the radar sensor 2a, in the simulated environment scenario; i.e. taking the simulation data D into account. As described in detail in conjunction with FIG. 2, on the basis of the simulated propagation of the virtual radar signal, the radar cross section of a simulated radar target can be derived from the simulated environment scenario, e.g. the radar cross section of another vehicle or an obstacle, potentially influenced by environmental conditions as the case may be. The device 4 outputs the radar cross section thusly determined, possibly with other information such as for instance the distance of the simulated radar target from the vehicle 2, the azimuth angle of the simulated radar target relative to the vehicle 2, the Doppler shift of the radar signal reflected at the simulated radar target and/or the like.

The stimulation device 5 is preferably configured to effect the manipulation of the radar signal R by delaying and/or modulating the signal. To that end, the stimulation device 5 preferentially comprises an at least partially analog circuit through which the received radar signal R is looped, for example via a receiving antenna, before being transmitted to the radar sensor 2a, via for example a transmitting antenna. Alternatively or additionally, the stimulation device 5 can however also comprise a computing device configured to at least partially digitally manipulate the radar signal R.

FIG. 2 shows a preferential exemplary embodiment of an inventive method 1a for determining a radar cross section a of a simulated radar target, in particular for stimulating a real radar signal in a radar target emulator.

In a method step S1, the propagation of a virtual radar signal in a simulated environment scenario, which is preferably characterized by the simulation data D and contains for example a simulated radar target, is simulated on the basis of an interaction model W particularly based on provided simulation data D. The interaction model W can thereby have been trained in preceding method steps, even in a separate method as the case may be (see FIG. 4). For example, the interaction model W can be adapted through comparison with an analytic description of the radar signal propagation or an experiment on the propagation of radar signals, for instance by determining model parameters of the interaction model W.

The propagation of the virtual radar signal in the environment scenario can be simulated for example in two sub-steps S1a, S1b. In the first sub-step S1a, an at least substantially rectilinear, more or less radial propagation of multiple partial signals can for instance be assumed up until one or more partial signals impinge the virtual radar target and interact with same. The partial signals thereby preferably propagate within a specified solid angle range from a transmitter point, wherein the transmitter point within the environment scenario preferentially corresponds to the position of a vehicle emitting the virtual radar signal. The propagation of the virtual radar signal or the partial signals respectively can be simulated for example by means of ray tracing, particularly until the radar signal or at least one of the partial signals respectively strikes the simulated radar target.

The interaction of the virtual radar signal, in particular at least one partial signal, with the simulated radar target is preferably modeled in a second sub-step S1b so as to divide a physical variable characterizing the virtual radar signal, for instance a power density or a field strength. A portion of the radar signal can be for example represented by a directional component Ga which corresponds to a directed scattering of the virtual radar signal. In contrast, another portion of the radar signal can be represented by a diffuse component Gb which corresponds to an isotropic scattering of the virtual radar signal. A part of the radar signal subsequent the interaction can therefore be detected at a receiver point independently of the direction defined by the distance between the simulated radar target and the receiver point. Another part of the radar signal can in contrast only be detected at a receiver point lying within a specific solid angle range in which the directed component Ga is scattered.

Preferably, the interaction with the simulated or further simulated radar targets is calculated for all partial signals of the virtual radar signal so that subsequent method step S1, there are at least a number of directional and diffuse components which correspond to the number of partial signals having interacted with simulated radar targets.

The propagation of the virtual radar signal can also be simulated iteratively by repeating sub-steps S1a, S1b, in particular so as account for interreflections. The propagation of the directional component Ga; i.e. the directionally scattered portions of the originally simulated radar signal, is thereby simulated in subsequent sub-steps S1a and the interaction of the directional component Ga with a further simulated radar target calculated in subsequent sub-steps S1b. This can be performed until none of the directional components Ga encounter a further radar signal.

In a further method step S2, a value G of the physical variable is determined at a receiver point. The directional component Ga and the diffuse component Gb are thereby preferably taken into account, for instance by adding together the physical variable for different parts of the original radar signal at the receiver point. This can yield a particularly high value G for the physical variable when the receiver point lies within the solid angle range in which one or more directional components Ga is or will be scattered.

The receiver point can be arranged at any position within the environment scenario. Preferably, however, the receiver point corresponds to the transmitter point from which the original virtual radar signal emanates.

On the basis of the determined value G of the physical variable, the radar cross section a of the simulated radar target can be determined and output in a further method step S3.

Figure 3:
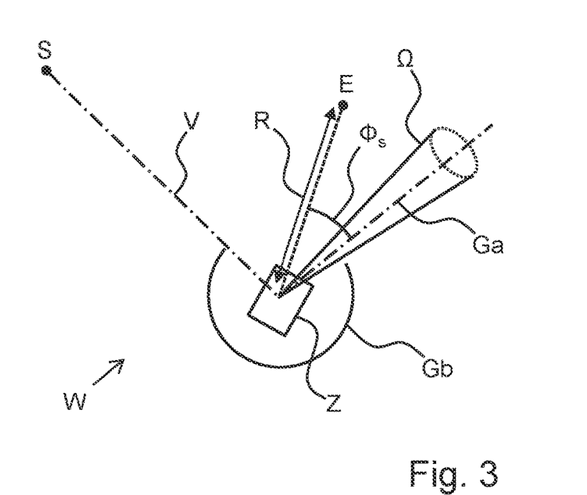
FIG. 3 a preferential exemplary embodiment of an interaction model for modeling the interaction of a virtual radar signal with a simulated radar target.

FIG. 3 shows a preferential exemplary embodiment of an interaction model W for the modeling of the interaction of a virtual radar signal V with a simulated radar target Z, whereby the virtual radar signal V propagates at least substantially rectilinearly from a transmitter point S. When the virtual radar signal V strikes the simulated radar target Z, part of the virtual radar signal V is scattered isotropically and another part is scattered in a directed manner pursuant to the interaction model W. The isotropically scattered portion, which propagates at least substantially uniformly in every spatial direction from the simulated radar target Z, is referred to as the diffuse component Gb. The directionally scattered portion, which propagates from the simulated radar target Z substantially within one solid angle range $\Omega$, is referred to as the directional component Ga.

The interaction is preferably described on the basis of a physical variable which characterizes the virtual radar signal V, for example the power density or the field strength of the virtual radar signal V. According to the interaction model W, the physical variable is divided into the diffuse component Gb and the directional component Ga. In order to determine a radar cross section on the basis of the interaction model W, the share of the differently scattered portions of the virtual radar signal V relative to a signal in receiver point E is determined. For example, the diffuse component Gb and the directional component Ga can be added up and the sum compared to the original physical variable in order to determine the radar cross section.

The interaction is preferably described using the Phong formula $P_{scat}=k_d+k_s\cdot\cos^{n_s}\phi_s$, wherein $k_d$ indicates the isotropically scattered portion of the virtual radar signal V, $k_s$ indicates the directionally scattered portion of the virtual radar signal V, and the so-called Phong exponent $n_s$ indicates the width of the solid angle range $\Omega$. $k_d$, $k_s$ and $n_s$ are also referred to as model parameters. The so-called scattering angle $\phi_s$ indicates the angle between the direction of propagation of the directionally scattered portion of the virtual radar signal V and the connecting line between the simulated radar target Z and a receiver point E in the direction of which the power P is scattered.

Although the Phong formula is empirical, it can be used to describe a realistic scattering of radar signals, in particular when using a modified Phong formula with a directionality term of $\alpha=2\pi/(n_s+1)$. The power density P' able to be determined at receiver point E at a distance R from the simulated radar target Z when the virtual radar signal V is scattered at the simulated radar target Z at power $P_{in}$ has a result of $P'=P_{in}[k_d/(4\pi R^2)+k_s\cdot\cos^{n_s}\phi_s/(2\pi R^2(n+1))]$. Thus, diffuse component Gb can be regarded as the term $P_{in}\cdot k_d/(4\pi R^2)$ and directional component Ga as the term $P_{in}\cdot k_s\cdot\cos^{n_s}\phi_s/(2\pi R^2(n+1))$.

The degree of the division; i.e. the portion of the virtual radar signal V indicated by diffuse component Gb and directional component Ga after the virtual radar signal V impinges the simulated radar target Z, can for example depend, inter alia, on an orientation of the simulated radar target Z relative to the transmitter point S, in particular on the orientation of a surface normal of the simulated radar signal Z relative to the test vehicle; i.e. the transmitter point S (not shown). Particularly preferentially, however, the degree of the division depends on a property of the simulated radar target Z, e.g. a surface property, material and/or the like attributed to the radar target Z.

These dependencies can in particular be expressed by an appropriate selection of the kJ, $k_s$ and $n_s$ model parameters. The adaptation of the Phong formula to different scattering situations is explained below.

Figure 4:
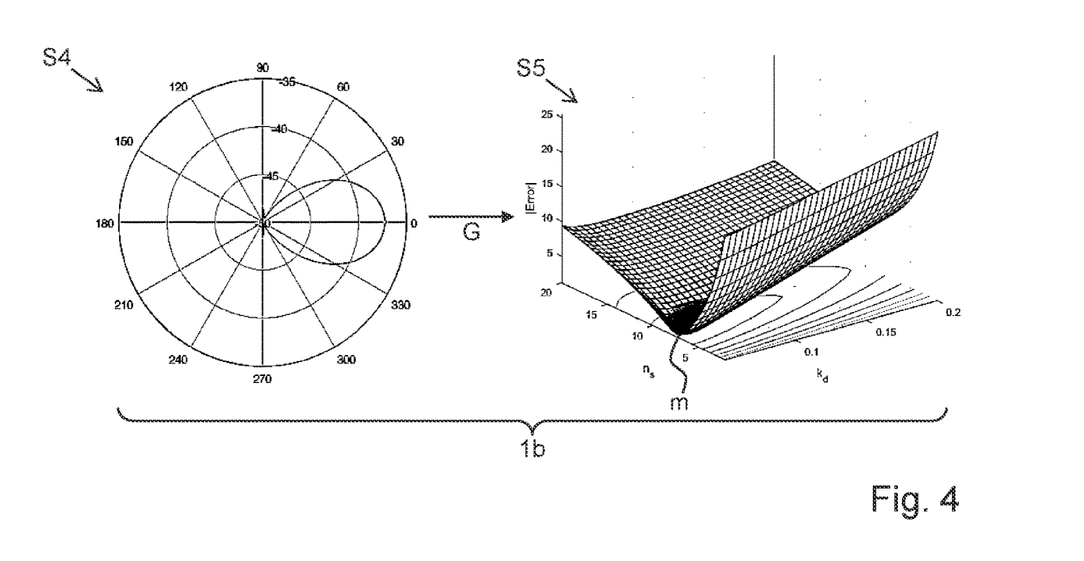
FIG. 4 a preferential exemplary embodiment of a method for training an interaction model.

FIG. 4 shows a preferential exemplary embodiment of a method 1b for training an interaction model, by means of which an interaction of a virtual radar signal with a simulated radar target can be modeled such that a physical variable which characterizes the virtual radar signal is divided into a into a directional component corresponding to a directed scattering of the virtual radar signal and a diffuse component corresponding to an isotropic scattering of the virtual radar signal.

In a method step S4, the interaction of a virtual or real radar signal with a reference target is simulated on the basis of an analytic description of the reflection of the radar signal at the reference target or is modeled by means of an experiment. Thereby preferably determined is at least one value G of a physical variable which characterizes the virtual radar signal reflected at the reference target.

For example, equations which analytically describe the interaction of electromagnetic radiation with an object can be solved numerically in order to determine the distribution of the power $P_{scat}$ scattered on the object as a function of the scattering angle $\phi_s$. Alternatively, the distribution can also be determined experimentally by means of an appropriate experimental setup in the context of which real radar signals are reflected or respectively scattered on a real object.

In a further method step S5, at least one model parameter $k_d$, $k_s$, $n_s$ of the interaction model, e.g. the potentially modified Phong formula, is determined on the basis of the at least one determined value G of the physical variable.

For example, the distribution of the power $P_{scat}$ scattered on the object as a function of the scattering angle $\Phi_s$ can be fitted to the interaction model, in particular with the Phong formula. In particular able to be determined is that set m of model parameters $k_d$, $k_s$, $n_s$ for which a deviation is determined between the at least one value G of the physical variable determined on the basis of an analytic description and at least one value G of the physical variable determined by means of the Interaction model.

Preferably thereby capitalized on is there being at least to some extent a dependency between the model parameters $k_d$, $k_s$, $n_s$. In particular utilized is the fact that $k_d+k_s=1$.

Performing method steps S4, S5 can ensure that the interaction model, in particular the potentially modified Phong formula, realistically renders the interaction of a radar signal with a radar target; i.e. at least substantially accurately in physical terms. In other words, the interaction model, in particular a directionality term added to the Phong formula, can be normalized.

A sphere is preferably used as the reference target since the interaction of a radar signal with a sphere is able to be simulated particularly precisely and realistically.

Method steps S4, S5 can also be performed multiple times for different reference target surface properties and/or materials and the model parameters $k_d$, $k_s$, $n_s$ thereby determined stored in a database, in particular linked to the respective surface properties and/or materials. This procedure, referred to as interaction model characterization, enables using those model parameters $k_d$, $k_s$, $n_s$ when applying the interaction model as a function of the properties of simulated radar targets in a simulated environment scenario (see FIG. 2), which allows for a particularly realistic description of the interaction.

LIST OF REFERENCE NUMERALS 1a method for determining a radar cross section
1b method for training an interaction model
2 vehicle
2a radar sensor
3 simulation device
4 device for determining a radar cross section
5 stimulation device
10 radar target emulator
100 system S1-S5 method steps
S1a, S1b sub-steps
D simulation data
P stimulation point
R real radar signal
R' modified radar signal
W interaction model
G physical variable value
Ga directional component
Gb diffuse component
a scattering cross section
S transmitter point
E receiver point
V virtual radar signal
Z simulated radar target
$\phi_s$ scattering angle
$\Omega$ solid angle range
R distance
P scattered power density
$P_{scat}$ scattered power
$P_{in}$ radar signal power
$k_d$, $k_s$, $n_s$ model parameter
m model parameter set

What is claimed is:

1. A method for determining a radar cross section of a simulated radar target, comprising:
    simulating a propagation of a virtual radar signal on the basis of an interaction model in a simulated environment scenario which contains the simulated radar target, wherein an interaction of the virtual radar signal with the simulated radar target is modeled such that a physical variable characterizing the virtual radar signal is divided into a directional component corresponding to a directed scattering of the virtual radar signal and a diffuse component corresponding to an isotropic scattering of the virtual radar signal, wherein the propagation of the directional component of the virtual radar signal is simulated in a sub-step and the interaction of the directional component with a further simulated radar target is calculated in a subsequent sub-step;
    determining a value of the physical variable at a receiver point in the simulated environment scenario factoring in the directional component and the diffuse component; and
    deriving the radar cross section of the simulated radar target from the determined value of the physical variable at the receiver point.

2. The method according to claim 1, wherein the propagation of the virtual radar signal from a transmitter point in the simulated environment scenario to the simulated radar target is simulated on the basis of an analytic description of propagation of radar signals.

3. The method according to claim 1,
    wherein the virtual radar signal contains a plurality of partial signals and the interaction of the virtual radar signal with the simulated radar target is modeled for each of the partial signals, and
    wherein the radar cross section derived on the basis of a plurality of determined values of the physical variable at the receiver point.

4. The method according to claim 1, wherein the physical variable is divided into the directional component and the diffuse component as a function of at least one model parameter characterizing a physical property of the simulated radar target.

5. The method according to claim 1 using the Phong formula.

6. A device for determining a radar cross section of a simulated radar target which is configured to realize a method according to claim 1.

7. A radar target emulator for manipulating a real radar signal output by a vehicle, comprising:
    a simulation device which is configured to simulate an environment scenario and output simulation data characterizing the environment scenario;
    a device for determining a radar cross section of a simulated radar target according to claim 6 that is configured to output at least one stimulation point on the basis of the simulation data; and
    a stimulation device configured to record the real radar signal, manipulate the real radar signal on the basis of at least one stimulation point, and output the manipulated radar signal.

8. A test facility for a vehicle, comprising a radar target emulator according to claim 7.

9. The method according to claim 1, wherein the sub-step and the subsequent sub-step are repeated until none of the respective directional components encounter a further radar signal.

10. A method for training an interaction model, by means of which an interaction of a virtual radar signal with a simulated radar target can be modeled such that a physical variable characterizing the virtual radar signal V is divided into a directional component corresponding to a directed scattering of the virtual radar signal and a diffuse component corresponding to an isotropic scattering of the virtual radar signal, comprising:
    simulating the interaction of a virtual radar signal with a reference target on the basis of an analytic description of a reflection of the virtual radar signal at the reference target, wherein a first value of a physical variable which characterizes the virtual radar signal reflected at the reference target is determined, or
    modeling the interaction of a real radar signal with a real emulation of the reference target, wherein a second value of the physical variable which characterizes the real radar signal reflected on the real emulation of the reference target is measured; and
    determining at least one model parameter the interaction model on the basis of the first value or the second value of the physical variable.

11. The method according to claim 10, wherein the at least one model parameter is determined on the basis of a curve fitting.

12. The method according to claim 10, wherein the reference target is a sphere.

13. The method according to claim 10,
    wherein a propagation of the virtual radar signal or the real radar signal is respectively simulated or modeled for multiple different reference objects,
    wherein at least one model parameter is in each case determined on the basis of the respective first value or second value of the physical variable determined, and
    wherein the determined at least one model parameter is stored as a function of object properties of the multiple different reference objects.

* * * * *